March 3, 1942.    F. J. BECHERT    2,275,343
CHUCKING MEANS
Filed March 1, 1939
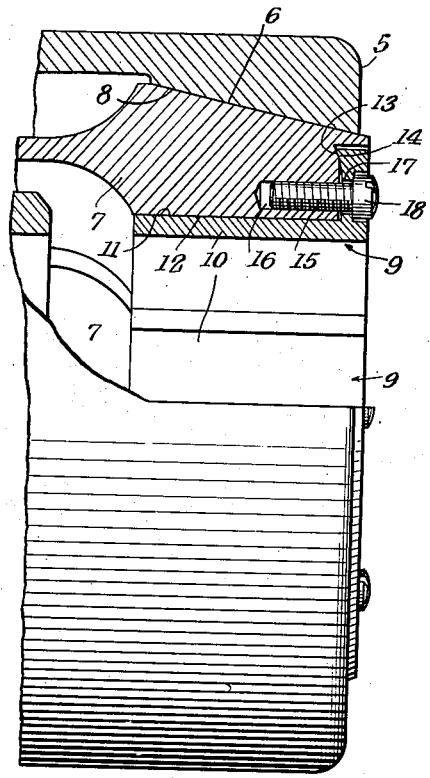
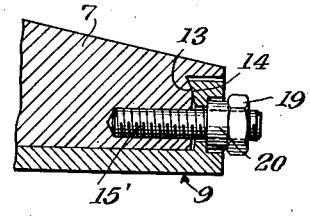
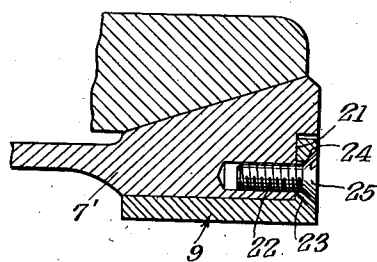
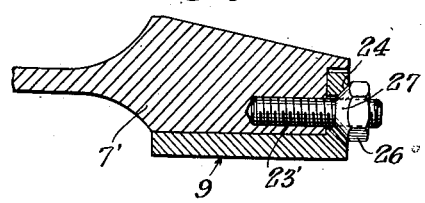
INVENTOR
FRED J. BECHERT
BY
*Mitchum Bechert*
ATTORNEYS Patented Mar. 3, 1942

2,275,343

UNITED STATES PATENT OFFICE 2,275,343

CHUCKING MEANS

Fred J. Bechert, Stamford, Conn., assignor to The New Britain Machine Company, New Britain, Conn., a corporation of Connecticut Application March 1, 1939, Serial No. 259,172

1 Claim. (Cl. 279—51)

My invention relates to a chucking means and more particularly to false jaws or pads.

Collets with false jaws now commonly employed require at least partial withdrawal of the collet from the collet seat in order to render the radially extending screws or other holding means accessible for releasing the pads. The pads may then be dropped toward the center and removed axially. Furthermore, the pads of the type above noted tend to move axially or shuck somewhat and substantial stresses are placed upon the screws or other holding means while the chuck is in operation.

It is the general object of my invention to provide an improved form of pad or false jaw and means for holding the same in place.

It is another object to provide an improved form of false jaw and holding means with improved means for camming the pads into position.

Another object is to provide an improved form of pad and holding means readily accessible for pad changing without removing the collet from its seat.

Another object is to provide an improved form of pad which may be removed in an axial direction without first dropping the same toward the center.

Other objects and various features of invention will be hereinafter pointed out or will become apparent to those skilled in the art.

In the drawing which shows, for illustrative purposes only, preferred forms of the invention—

Fig. 1 is a fragmentary side view in partial section of a collet chuck, illustrating one form of the invention;

Fig. 2 is a fragmentary view illustrating a slightly modified form;

Fig. 3 is a fragmentary view, illustrating still another modification;

Fig. 4 is a view similar to Fig. 3, illustrating a slight modification.

The collet chuck in general includes what may be the spindle nose 5 having a seat 6 therein tapering inwardly toward the front for receiving a push type of collet. The collet includes a plurality of jaws 7—7, the outer surfaces of which have tapering surfaces 8 for coaction with the seating surface or surfaces 6 for causing the jaws to release or grip the stock, as will be understood.

The jaws are equipped with pads 9—9 which preferably comprise an annular sleeve portion 10 having a generally axially extending surface 11 for coaction with a similarly formed surface 12 on the inner side of each of the jaws. Each jaw has a generally radially extending surface 13 which is inclined somewhat so as to form a cam surface, and each pad has a corresponding, generally radially extending surface 14 inclined somewhat so as to fit the cam surface 13. Therefore, with the surfaces 13—14 in contact when the pad is moved toward the left as viewed in Fig. 1, the axially extending surfaces 11—12 will be cammed into engagement with each other.

The pads are cammed into position on the jaws by suitable means, preferably in the form of screw means, such as a screw 15 threaded into an axially extending threaded bore 16 in the jaw. The screw 15 passes through an oversize opening 17 in the radially outwardly extending or flange portion of the pad, and means such as a head 18 on the screw 15 engages the bottom of the counterbore in the flange portion of the pad, as will be clear from the drawing. Now when the screw 15 is turned up, the cam surfaces 13—14 will be urged into engagement with each other and the annular portion 10 of the pad may be urged radially outwardly so as to firmly engage the surfaces 11—12. The pads will thus be firmly secured to the jaw with the surfaces 11—12 taking the chucking pressures and surfaces 13—14 taking the thrust pressures. It will be clear that in the push type of collet, as shown in Fig. 1, the stock thrust is toward the left on chucking up and therefore in the chucking up operation the pad is urged toward the left. Such urge, however, is resisted by the surfaces 13—14 and therefore all of the chucking pressures both radially and axially are taken by abutment surfaces on the pads and chuck jaws.

In the modification shown in Fig. 2, all of the parts are substantially the same as heretofore described and have been similarly designated. However, instead of employing a screw 15 with a head 18, I may employ a stud 15' which is secured in the jaw 7 and a nut 19 with interposed sleeve 20 may serve to urge the pads 9 as heretofore described in connection with Fig. 1.

In the form shown in Fig. 3, which merely for illustration shows a collect of the drawback type, the collet jaw 7' has an outwardly flaring taper for reception in the collet seat, as will be understood. The pad 9' is quite similar to the pad 9 shown in Fig. 1, except that instead of the cam surfaces 13—14 there are flat radial surfaces abutting each other as shown at 21. The pad has an oversize opening 22 therethrough for the passage of screw means in the form of a screw 23 threaded into a bore in the jaw. There is a cam surface 24 adjacent the bore and means such as a head 25 on the screw 23 serves to engage the cam surface 24 so that when the screw 23 is turned up, the pad will be urged axially toward the left and radially outwardly so as to cause solid engagement between the pad and the jaw in both the radial and axial directions. It will be clear that the invention as disclosed in Fig. 3 is not dependent upon the use of a drawback type of collet as there shown and a push type of collet, as shown for example in Fig. 4, would be as effective. With the drawback type of collet as shown in Fig. 3, the stock thrust during chucking up is toward the right and in that case the screw would take the stock thrust during chucking up. If the collet of Fig. 3 had been shown as a push type collet, the stock thrust would be taken by the solid abutment surfaces 21 between the jaw and the pad.

In the form shown in Fig. 4 the parts are in general the same as in Fig. 3 and the same reference characters have been applied thereto. The collet is shown as of the push type rather than the drawback type as in Fig. 3. Instead of employing a headed screw 23 as in Fig. 3, I employ a stud 23' secured in the jaw and extending through and beyond the flange portion of the pad. A nut 26 having a taper or cam surface 27 thereon is threaded into the stud and serves to engage the cam surface 24 on the pad so as to urge the same radially outwardly and axially toward the left.

It will be seen that I have provided a collet with pads which may be readily changed. By merely removing the screws the pads may be pulled out directly without first dropping the same toward the center. Thus the jaws of adjacent pads may come quite close together, thus reducing to a minimum the possibility of chips and foreign matter entering between the pads. The pads may be held and arranged so that all chucking pressures are taken by solid abutment surfaces between the pads and jaws.

While the invention has been described in considerable detail and preferred forms illustrated, it is to be understood that various changes and modifications may be made within the scope of the invention as defined in the appended claim.

I claim:

A collet including a plurality of jaws, pads for said jaws, outwardly extending flanges at the front of said pads, coacting cam surfaces on said jaws and flanges at the front of said collet, said cam surfaces being formed to urge said pads radially outwardly of said jaws, and means for urging said cam surfaces into engagement with each other for camming said pads outwardly of and into position on said jaws.

FRED J. BECHERT.